Patented Dec. 16, 1930

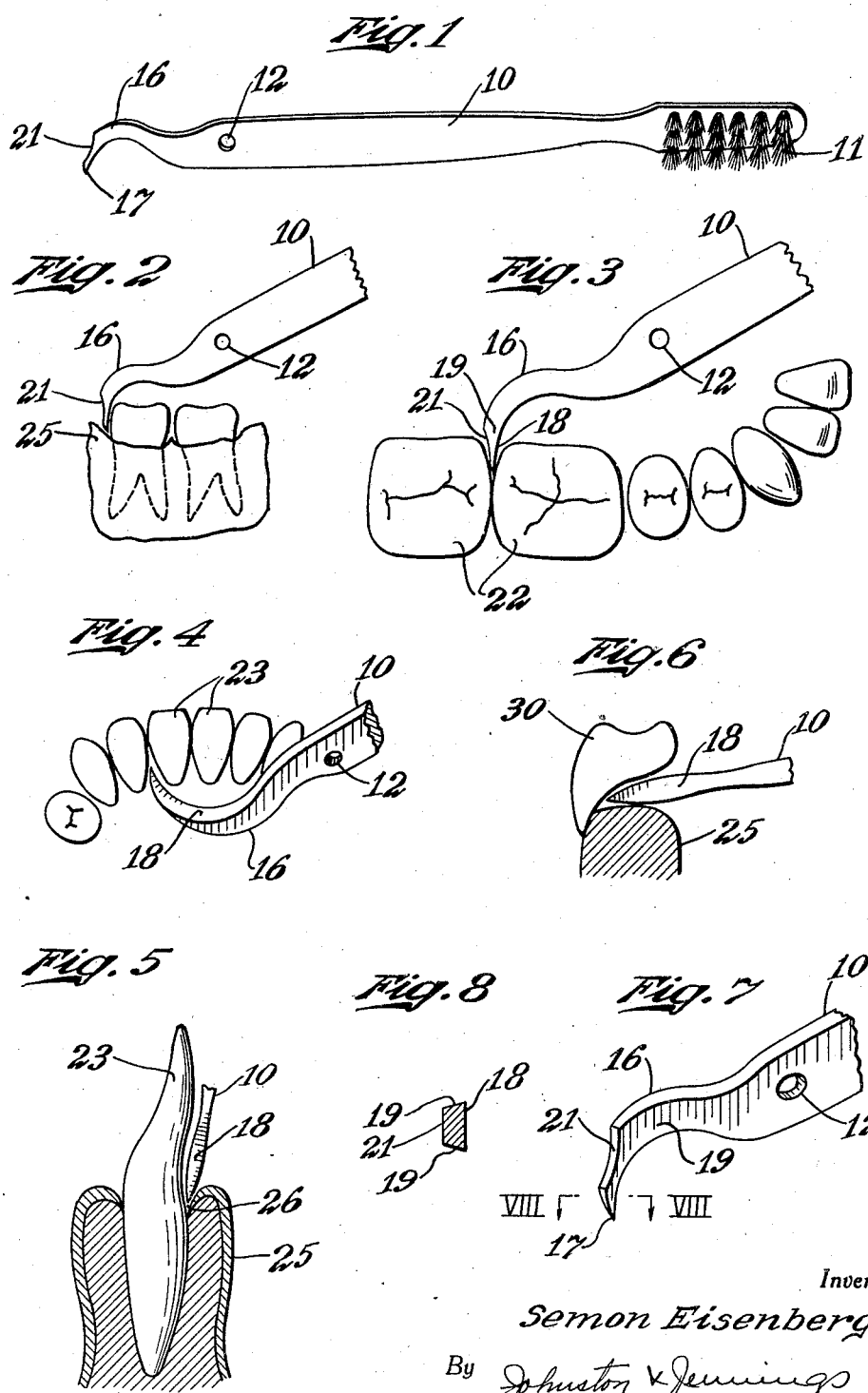

1,784,986

UNITED STATES PATENT OFFICE

SEMON EISENBERG, OF SAVANNAH, GEORGIA

TOOTHBRUSH

Application filed February 1, 1929. Serial No. 336,680.

My invention relates to tooth brushes and has for its object to improve the utility thereof.

Another object of my invention is to fashion the handle of a tooth brush into a shape which will easily permit its use as a means of removing food accumulations from on and in between and around the natural teeth and under the free margin of the gums where it is difficult for the bristles of a tooth brush to reach and clean.

A further object of my invention is to form the handle of a tooth brush into a shape which will easily permit its use by a layman as a means of removing tarter accumulations on and in between the natural teeth.

Another object of my invention is to form the handle of a tooth brush into a shape which will easily permit its use as a means of removing accumulations under the false teeth of fixed bridge work.

As is well known in the art to which my invention relates, food débris and tartar accumulations between and on the teeth tend to decay the teeth, inflame the gums and create an unhealthy condition in the mouth. It is also well known that dental restorations such as bridges, fillings, etc., last longer and better if kept free of débris. It is furthermore well understood that the ordinary tooth brush, even when used with great care, is seldom, if ever, capable of preventing such accumulations, especially in proximity to the gums, between the teeth, on the inner surfaces of the front teeth, behind the wisdom teeth and under the free margin of the gums. It is the custom to permit such débris and tartar to accumulate and harden on the teeth and then periodically go to the dentist and have it removed. Obviously such a procedure is unsanitary and entails an unhealthy condition of a person's mouth at all times except immediately after cleaning by a dentist.

In accordance with my invention I provide a tooth brush handle which may be made of any suitable material, and fashion the end of the handle into a cleaning implement. This cleaning implement is made of especial shape and contour, to be more particularly described later, whereby the user may employ it to aid greatly in keeping his own teeth and mouth clean and therefore more healthy.

Apparatus embodying features of my invention is illustrated in the accompanying drawings, forming a part of this application, wherein Fig. 1 is a perspective view of a tooth brush embodying my invention;

Fig. 2 is a view of the implement formed on the end of the tooth brush handle showing the use thereof with relation to the last teeth in the mouth.

Fig. 3 is an enlarged view similar to Fig. 2 showing the use of the implement between two of the back teeth;

Fig. 4 is an enlarged view showing the implement being used in cleaning the inside of the front teeth;

Fig. 5 is an enlarged sectional view showing the use of the implement in reaching and cleaning the teeth around the gingival groove;

Fig. 6 is a sectional view showing the use of the implement in cleaning the lingual side of bridge work;

Fig. 7 is an enlarged perspective view looking down on the end of the implement; and Fig. 8 is an enlarged sectional view taken along the line VIII—VIII of Fig. 7.

Referring to the drawings for a better understanding of my invention I show a tooth brush having a handle 10 and provided with the usual bristles 11. The handle is of the usual general tooth brush handle form. Towards the outer end of the handle is provided a hole 12 for hanging the brush up when not in use.

A feature of my invention consists in the peculiar fashioning of the handle. The outer end of the handle is provided with a curved portion 16 which terminates in a point 17 to adapt the end of the handle for use in cleaning around and between the teeth, and under the free margin of the gums.

The inner surface of the curved portion 16, as shown at 18, lies substantially normal to the plane of curvature and the sides 19 of the curved portion, as shown in Fig. 8, converge from the inner side of the curve outwardly. This feature is important in that it provides a sharp edge to the curved portion where the surfaces 18 and 19 meet, which particularly adapts it to engage and remove tartar accumulations. The surface 18 is flat from side to side but concave in its length; its sides converging to the point 17.

In order that the curved portion 16 may be better adapted to enter between the teeth of the user, I provide the outer convex surface thereof near the point 17 with a concave portion 21 which approaches parallelism with the mesial forward surface of the posterior teeth, shown at 22, as may be better seen in Fig. 3. This permits the curved pointed end of the handle to be inserted in between the back teeth for the removal of débris and tartar therefrom, and permits surface 21 itself and edge formed by 21 and 19 to scrape the mesial surface and in like manner surface 18 and edge formed by 18 and 19 scrapes the distal surface of back teeth as shown in Fig. 3.

When using the curved end of the tooth brush handle to remove débris and tartar from the inside and between the front teeth, the flat inner surface 18 and point 17 naturally fall to the proper angle as may be clearly seen in Fig. 4 where the front teeth are indicated by the numeral 23 and the flat inner surface 18 of the curved portion 16 is clearly seen to approach at the proper angle for the removal of débris and tartar. The edge made by junction of 18 and 19 allows the scraping of the sides and back of these teeth by slightly tilting the handle sideways. As seen in Fig. 5, the gum is shown at 25 and the gingival groove at 26. The implement is shown as being of proper shape to adapt its use to cleaning the teeth around the gingival groove.

When cleaning around the last back teeth 22, the handle may be held in the position shown in Fig. 2 wherein it will be seen that the inner curved portion is of such radius that it approaches parallelism with the back distal contour of the last tooth and point 17 fits into and can easily clean the pocket usually formed behind the last tooth by the gum 25 curving upward.

In Fig. 6 of the drawings, I show a false tooth 30 such as is used in bridge work and which overhangs the gum 25 on the labial or buccal side thereof. From this view it will be seen the manner in which my improved implement is especially adapted for cleaning underneath and behind such teeth.

From the foregoing it will be apparent that I have devised an improved tooth brush wherein the handle thereof is so fashioned that it may be easily employed by laymen as an efficient means for the removal of débris and tartar accumulations of the mouth and thereby greatly assisting in keeping the teeth from decaying and in keeping the soft tissues from becoming inflamed and diseased.

While I have shown my invention in but one form, it will be obvious to those skilled in the art that it is not so limited, but is susceptible of various changes and modifications without departing from the spirit thereof, and I desire therefore that only such limitations shall be placed thereupon as are imposed by the prior art, or as are specifically set forth in the appended claims.

What I claim is:

1. A tooth brush handle having a pointed curved end, the inner surface of the curved end being subtantially normal to the plane of the curve, and the outer side of the curved pointed end being provided with a concave portion to adapt it for insertion between teeth.

2. A tooth brush handle having a pointed curved end, the inner surface of the curved end being substantially normal to the plane of the curve and the outer surface being substantially normal to the plane of the curve, and provided with a concave portion in its outer surface to adapt it for insertion between the teeth.

3. A tooth brush handle having a pointed curved end, the inner surface of the curved end being substantially normal to the plane of the curve, the sides of the curved pointed end converging from the inner side of the curve towards the outer portion thereof, and the outer side of the curved pointed end being provided with a concave portion to adapt it for insertion between teeth.

4. A relatively flat tooth brush handle having a comparatively rigid pointed curved end, said end being curved through a plane parallel with the flat sides of the handle, and the point of the end being formed by the juncture of four distinct converging surfaces, an innner, an outer, and two side ones, with definite sharp scraping edges existing where each two of these surfaces meet.

5. A relatively flat tooth brush handle with a comparatively rigid pointed curved end, said end having four distinct surfaces that converge to form the point, the inner surface being substantially normal to the plane of the curve, which curve conforms to the general convexity of the back (distal) surface of the back teeth.

6. A relatively flat tooth brush handle with a comparatively rigid pointed curved end, with said end having four distinct surfaces that converge to form the point, with the inner surface being substantially normal to the plane of the curve and concave, and with the two side surfaces being comparatively flat and forming scraping edges in cooperation with the inner surface, said side surfaces converging together at the point and converging towards each other from the inner surface towards the outer surface, thus also forming sharp scraping edges in cooperation with the outer surface.

7. A relatively flat tooth brush handle having a comparatively rigid pointed curved end, said end having four surfaces that converge to form the point, the inner surface being substantially normal to the plane of the curve and concave, the two side surfaces being comparatively flat and converging together at the point and converging towards each other from the inner surface towards the outer surface, the outer surface being substantially normal to the plane of the curve and being provided near the point with a concave portion that conforms to the general convexity of the forward (mesial) surfaces of the back teeth, and which permits the pointed end to be easily inserted between the teeth and provides concave scraping edges fitting the convexity of the mesial surface of teeth where the side surfaces of the end join this concave portion.

In testimony whereof I, SEMON EISENBERG, affix my signature.

SEMON EISENBERG.